United States Patent
Bortz et al.

(10) Patent No.: US 7,639,798 B1
(45) Date of Patent: Dec. 29, 2009

(54) HIGH SPEED DATA ENCRYPTION ARCHITECTURE

(75) Inventors: Mark A. Bortz, Robins, IA (US); Philippe M. T. Limondin, Cedar Rapids, IA (US); T. Douglas Hiratzka, Coralville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 939 days.

(21) Appl. No.: 11/227,682

(22) Filed: Sep. 15, 2005

(51) Int. Cl.
*H04L 9/00* (2006.01)
*G06F 11/30* (2006.01)
*G06F 7/04* (2006.01)

(52) U.S. Cl. .............. 380/28; 726/16; 726/17; 726/18; 713/189; 713/190; 713/191; 713/192; 713/183

(58) Field of Classification Search ............ 380/28
See application file for complete search history.

(56) References Cited

U.S. PATENT DOCUMENTS 6,069,489 A * 5/2000 Iwanczuk et al. ........... 326/40
7,123,720 B2 * 10/2006 Lim ........................ 380/265
2002/0150252 A1 * 10/2002 Wong ...................... 380/277
2005/0074125 A1 * 4/2005 Chavanne et al. .......... 380/278

* cited by examiner

*Primary Examiner*—Longbit Chai
(74) *Attorney, Agent, or Firm*—Matthew J. Evans; Daniel M. Barbieri (57) ABSTRACT

The present invention provides a high speed data encryption architecture in which fabric elements are communicatively coupled to one another via a hardwired interconnect. Each of the fabric elements includes a plurality of wide field programmable gate array (FPGA) blocks used for wide datapaths and a plurality of narrow FPGA blocks used for narrow datapaths. Each of the plurality of wide FPGA blocks and each of the plurality of narrow FPGA blocks are communicatively coupled to each other. A control block is communicatively coupled to each of the fabric elements via the hardwired interconnect to provide control signals to each of the fabric elements. The fabric elements are used to implement cryptographic algorithms.

16 Claims, 11 Drawing Sheets

FIG. 1

| Algorithm | Current PCP Data Rate | Future Data Rate |
|---|---|---|
| AES | 170 Mbps | > 1 Gbps |
| Medley | 100 Mbps | > 1 Gbps |
| Weasel | 240 Mbps | > 1 Gbps |

FIG. 2

PCP execution = (5 cycle inner loop) * 50 iterations @ 150 MHz = 1667 ns
GIG execution = (1 cycle inner loop) * 50 iterations @ 50 MHz = 1000 ns PCP / GIG = 1667 ns / 1000 ns = 1.66, 166% improvement

Serial Operation (2 Algorithms)

Mixed Operation (2 Algorithms)

HIGH SPEED DATA ENCRYPTION ARCHITECTURE

FIELD OF THE INVENTION

The present invention generally relates to computing systems and particularly to high speed data encryption architecture.

BACKGROUND OF THE INVENTION

Military and commercial computing, communication and navigation products often require high speed encryption and decryption of data. The Programmable Cryptography Processor (PCP) architecture has been developed by Rockwell Collins to address the security needs of several military products. The PCP provides a fully configurable, non-classified encryption core that supports a variety of legacy and modern algorithms.

Future systems using modern algorithms may have throughput requirements much greater than the current capabilities of the PCP design. In addition, continuing advances in algorithmic complexity and security levy strong requirements on the development of next-generation encryption hardware development. For example, future Satellite Communications (SATCOM), >2 GHz Joint Tactical Radio System (JTRS), and Global Information Grid applications may require at least a 10× increase in throughput within the next several years.

While the PCP is able to meet current data rate requirements, it may be unable to process the data rates required of future products. Thus, it is desirable to provide a new approach to flexible, reconfigurable encryption in order to meet the future needs.

SUMMARY OF THE INVENTION

In a first exemplary aspect, the present invention provides a high speed data encryption architecture in which fabric elements are communicatively coupled to one another via a hardwired interconnect. Each of the fabric elements includes a plurality of wide field programmable gate array (FPGA) blocks used for wide datapaths and a plurality of narrow FPGA blocks used for narrow datapaths. Each of the plurality of wide FPGA blocks and each of the plurality of narrow FPGA blocks are communicatively coupled to each other. A control block is communicatively coupled to each of the fabric elements via the hardwired interconnect to provide control signals to each of the fabric elements. The fabric elements are used to implement cryptographic algorithms.

In an additional exemplary aspect of the present invention, a method for implementing a cryptographic algorithm using field programmable gate arrays (FPGAs) includes steps as follows. Fabric elements that are communicatively coupled to one another via a hardwired interconnect are provided. Each of the fabric elements includes a plurality of wide FPGA blocks used for wide datapaths and a plurality of narrow FPGA blocks used for narrow datapaths. Each of the plurality of wide FPGA blocks and each of the plurality of narrow FPGA blocks are communicatively coupled to each other. Control signals are provided to each of the fabric elements using a control block. The fabric elements are configured to implement the cryptographic algorithm.

In another exemplary aspect of the present invention, a system for implementing a cryptographic algorithm using field programmable gate arrays (FPGAs) includes fabric elements that are communicatively coupled to one another via a hardwired interconnect. Each of the fabric elements includes a plurality of wide FPGA blocks used for wide datapaths and a plurality of narrow FPGA blocks used for narrow datapaths. Each of the plurality of wide FPGA blocks and each of the plurality of narrow FPGA blocks are communicatively coupled to each other. The system further includes means for providing control signals to each of the fabric elements and means for configuring the fabric elements to implement the cryptographic algorithm.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention addresses the interaction of the cryptography community (global positioning system (GPS), Mission Unique Equipment (MUE), Joint Tactical Radio System (JTRS)) with a system designed to provide high speed encryption capabilities necessary to remain competitive in future communication and navigation markets. In order to remain competitive in the communication and navigation system markets, cost-effective access to military grade encryption technology is required. The present high speed data encryption architecture or system may provide programmability and support for legacy and modern algorithms, have algorithm and key agility, and meet throughput requirements upward of 1 Gb/s.

Figure 1:
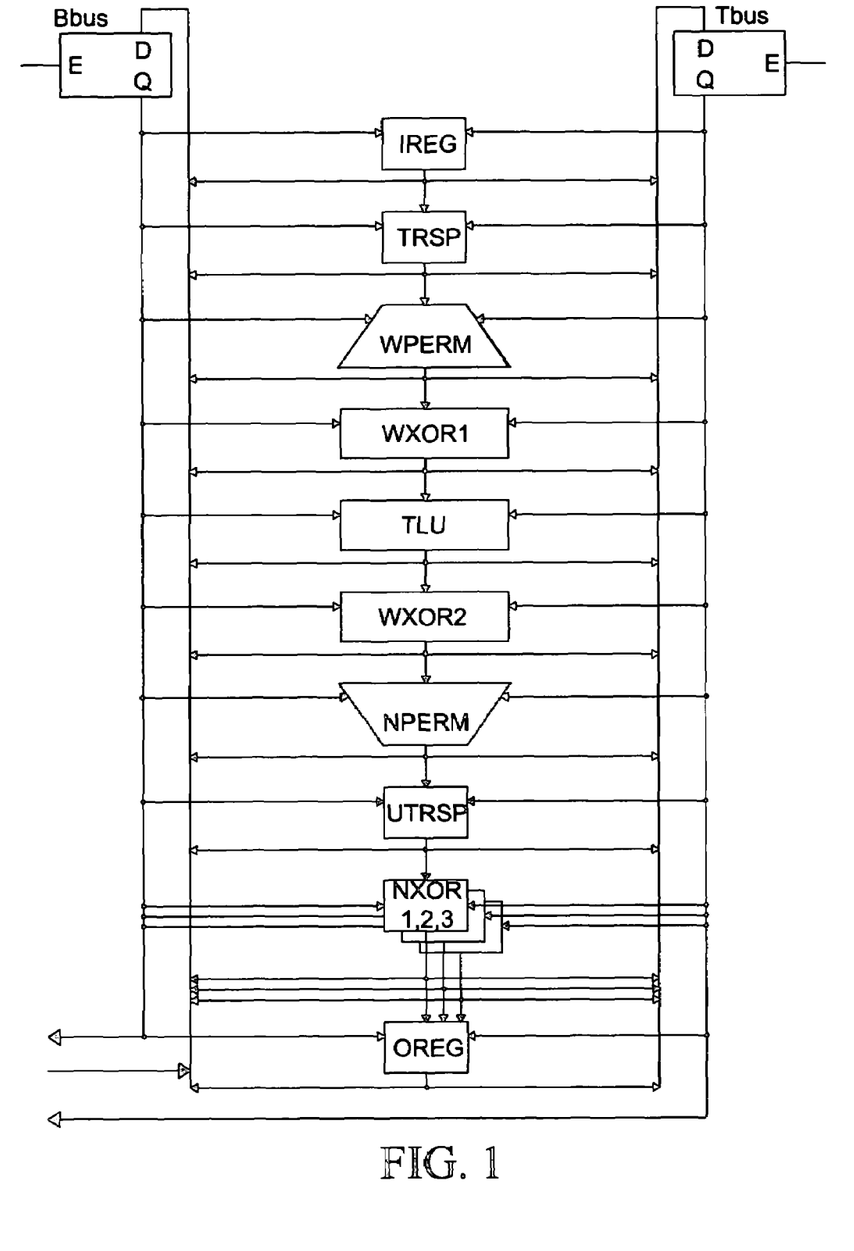
FIG. 1 shows a PCP architecture based on application specific integrated circuit (ASIC)

The Programmable Cryptographic Processor (PCP) serves as the basis for the Janus Crypto Engine, providing a fully configurable, non-classified encryption core that supports a variety of legacy and modern algorithms. The core pipeline structure of the PCP is shown in FIG. 1. Microcode controlled pipeline stages containing a variety of common cryptographic functions (Galois, permuter, multiplier, XOR, table look-up) afford the PCP flexibility to support any algorithm at the cost of performance. Current algorithm data rates achieved by the PCP are shown in FIG. 2, along with expected future data rate requirements.

Figure 2:
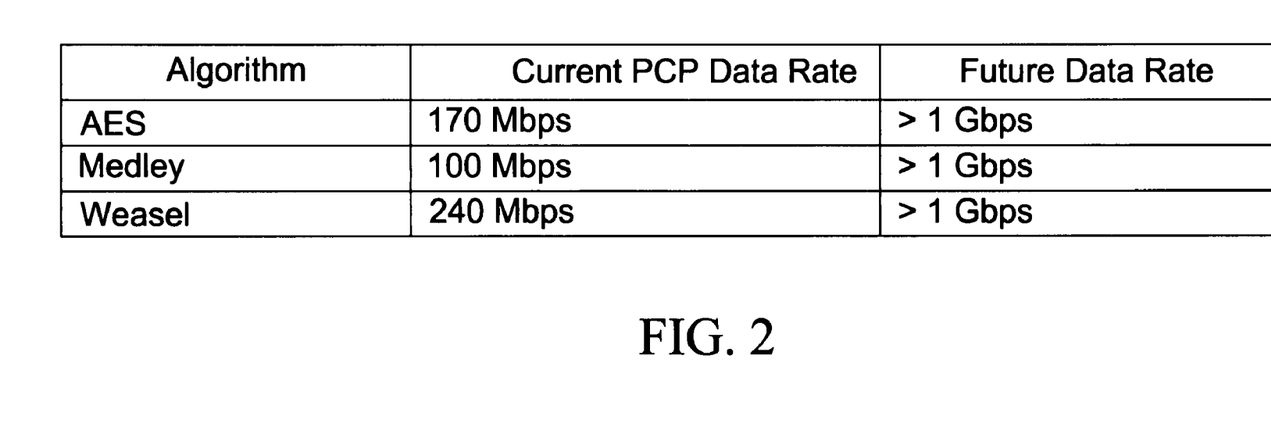
FIG. 2 shows modern algorithm data rates.

It is apparent from FIG. 2 that future systems using modern algorithms may have throughput requirements much greater than the current capabilities of the PCP design. Similar to the way the PCP serves as the basis of the Janus Crypto Engine, the present high speed data encryption architecture may serve as the basis for future high throughput encryption engines by addressing the performance challenges inherent to a traditional pipelined design.

Several architectural requirements pose a difficult challenge to creating a configurable, non-classified encryption unit which may still achieve the high throughput necessary for future communication and navigation systems. In one embodiment, the present high speed data encryption architecture may incorporate customized hardware specific to the target algorithm in order to achieve the desired throughput. In order to keep the design configurable and non-classified, the custom hardware may be implemented using a flexible FPGA fabric. The fabric may include a network of embedded FPGA cores with hardwired interconnect. Unlike the PCP design which implements an algorithm through microcode control of a pre-defined pipelined hardware structure, the present high speed data encryption architecture may generate custom hardware for each algorithm implementation by targeting it directly to the flexible FPGA fabric. In other words, the configurability of the algorithm design may be brought from the firmware level (microcode) down to the bare metal (hardware).

While FPGA designs have inherent advantages (flexibility, configurability, etc.) necessary for military grade cryptographic equipment, they may also have inherent disadvantages (slower, larger, and with higher power requirements than comparable custom ASIC designs) that need be overcome to successfully and efficiently achieve high throughput capabilities. The present high speed data encryption architecture addresses each of these issues in order to produce a system which meets all requirements.

Figure 3:
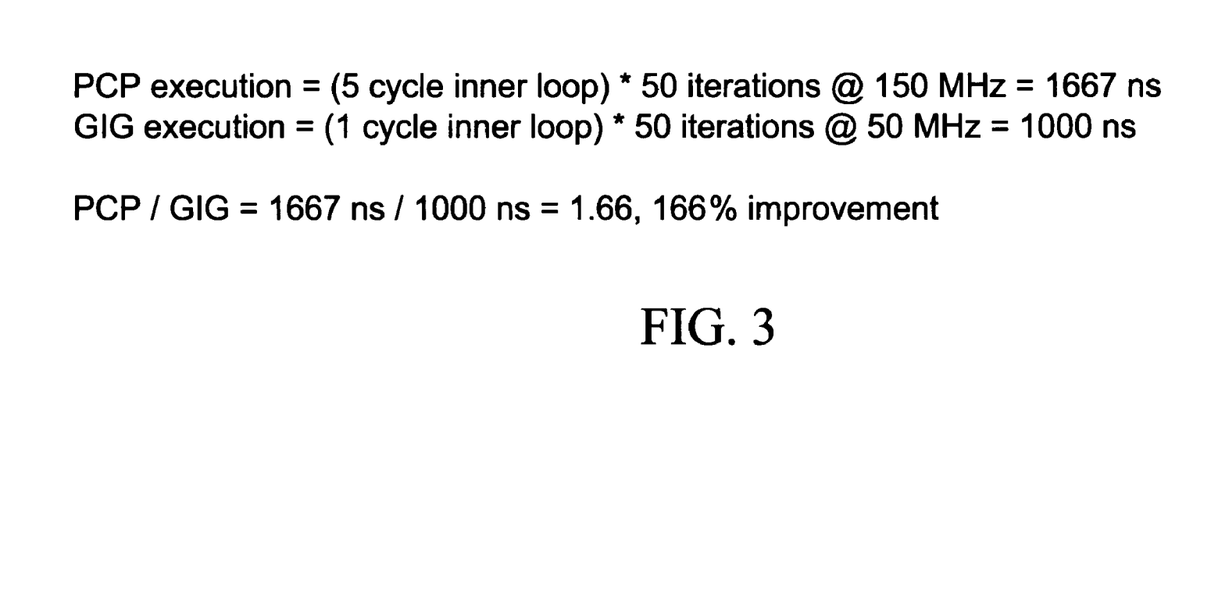
FIG. 3 shows that at ⅓ the execution speed of a PCP, a high speed data encryption architecture may achieve a 166% throughput improvement in accordance with an exemplary embodiment of the present invention.
Figure 4A:
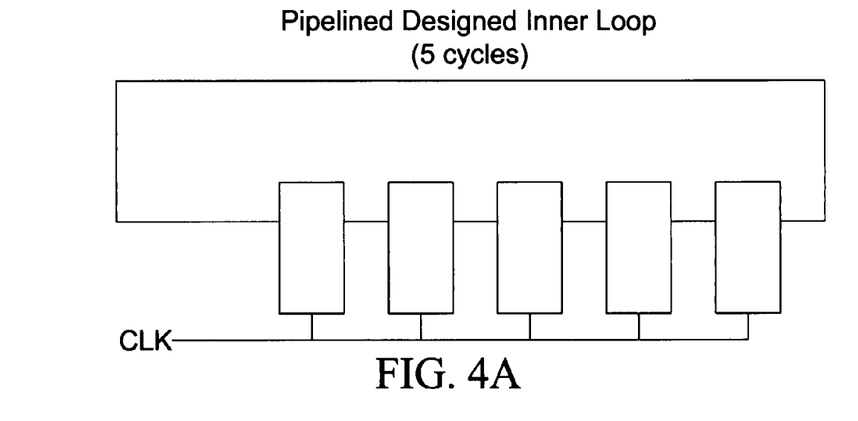
FIGS. 4A and 4B show inner loop executions for a PCP design and for a high speed data encryption architecture, respectively, in accordance with an exemplary embodiment of the present invention.
Figure 4B:
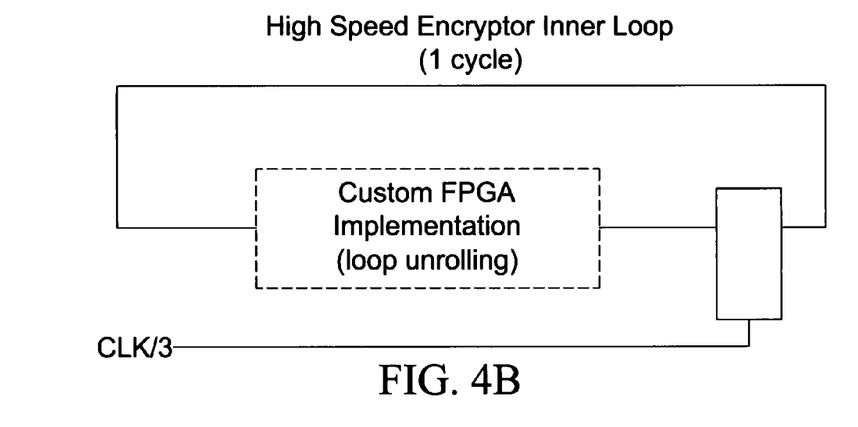

FPGA based implementations typically run at a lower speed than custom ASIC designs. An FPGA implementation of the high speed data encryption architecture, due to its embedded FPGA cores, may run approximately ⅓ the speed of a custom pipelined ASIC design. However, a custom pipelined design must adhere to a pre-defined pipeline structure for execution. Cryptographic algorithms commonly share the characteristic that a majority of the computation is done in tight loops that are iterated many times. The present high speed data encryption architecture makes improvements in timing by using loop unrolling techniques during execution. Loop unrolling, also known as loop unwinding, is a technique for optimizing parts of computer programs—a member of the loop transformation family. The idea is to save time by reducing the number of overhead instructions that the computer has to execute in a loop, thus improving the cache hit rate and reducing branching. To achieve this, the instructions that are called in multiple iterations of the loop are combined into a single iteration. This may speed up the program if the overhead instructions of the loop impair performance significantly. For example, as shown in FIG. 3, a traditional pipelined design (e.g., the PCP, etc.) with an inner loop that takes 5 clock cycles to execute and iterates 50 times takes 250 cycles to execute. In contrast, the present high speed (GIG) data encryption architecture executing the equivalent inner loop operation in 1 cycle per iteration takes 50 cycles to execute. Even at one-third the clock rate, this results in a 166% throughput improvement. FIGS. 4A and 4B show inner loop executions for a PCP design and for a high speed data encryption architecture, respectively, in accordance with an exemplary embodiment of the present invention.

Likewise, by implementing algorithms directly in the hardware using the flexible FPGA fabric structure, the present high speed data encryption architecture may take advantage of space and power saving techniques. Pre-defined pipeline architectures such as the PCP must account for all possible functions that may appear in current as well as future algorithms. As a result, many hardware units in these architectures are not used by all algorithms, and sit idle during execution. For example, the configurable Galois math logic is used by only a small subset of algorithms, the wide and narrow permuters are very flexible to allow for multiple functions, and 12 RAM s-boxes are included to support both 8 bit to 8 bit as well as 10 bit to 2 bit lookup. While still flexible, this may lead to much inefficiency in design. By contrast, a custom FPGA implementation of an algorithm may only create the resources necessary for execution, in essence executing using a fraction of the power and utilizing the available embedded FPGA area only as needed.

In one embodiment, the present high speed data encryption architecture combines high speed custom hardware with small programmable embedded FPGA blocks to produce a flexible framework capable of supporting both legacy and modern cryptographic algorithms, as well as providing support for future algorithm development. The present high speed data encryption architecture is a non-classified design capable of supporting multiple concurrent algorithms, while ensuring data integrity and security by preventing data mixing between multiple levels of security (MILS).

Figure 5:
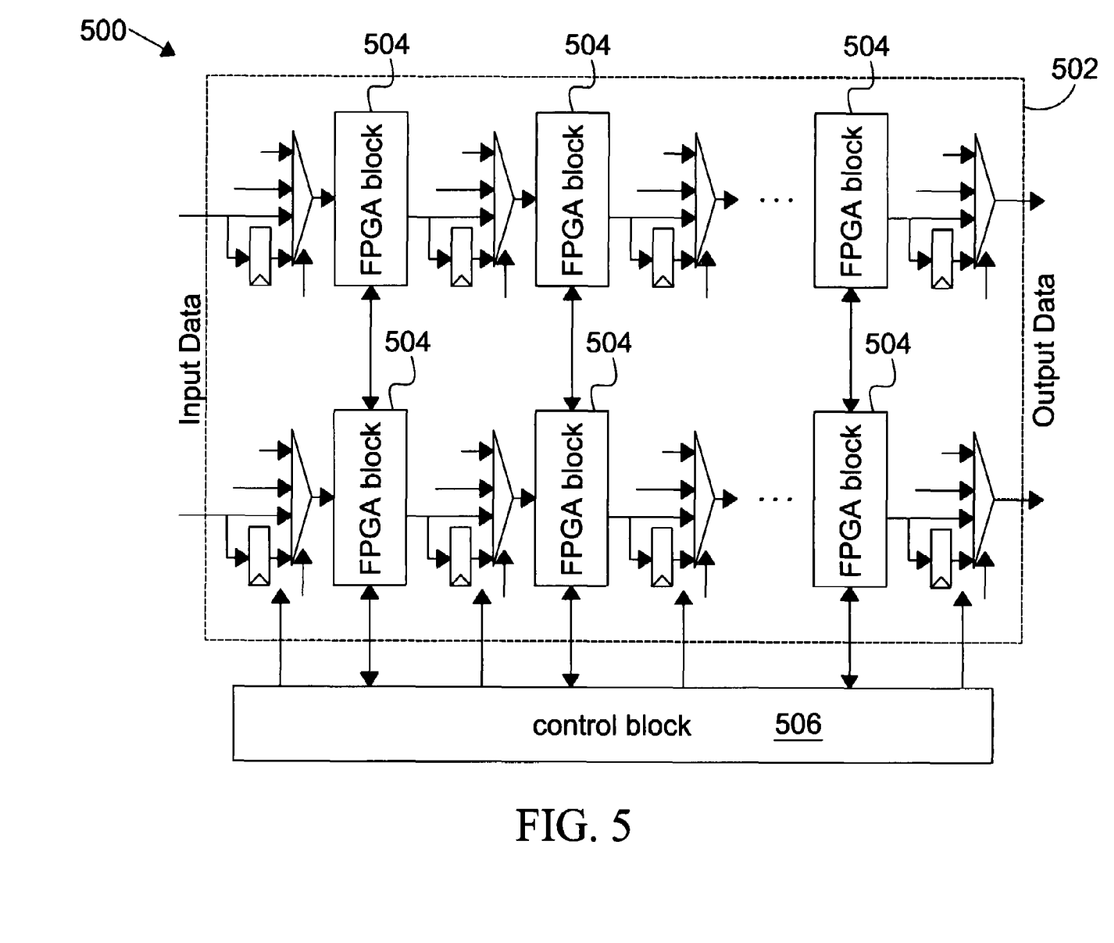
FIG. 5 is a schematic diagram illustrating a high speed data encryption architecture in accordance with one exemplary embodiment of the present invention.

FIG. 5 is a schematic diagram illustrating a high speed data encryption architecture 500 in accordance with one exemplary embodiment of the present invention. The architecture 500 includes a data processing unit 502 which has embedded FPGA blocks 504 with dedicated resources to register and route data between the blocks 504. One control block 506 may be dedicated to controlling the registers and routing muxes as well as providing undedicated control signals to the FPGA blocks 504. The control block 506 may be a system-level controller. The number of FPGA blocks in the architecture 500 may be scaled depending on complexity and the number of algorithms that need to be supported.

Figure 6:
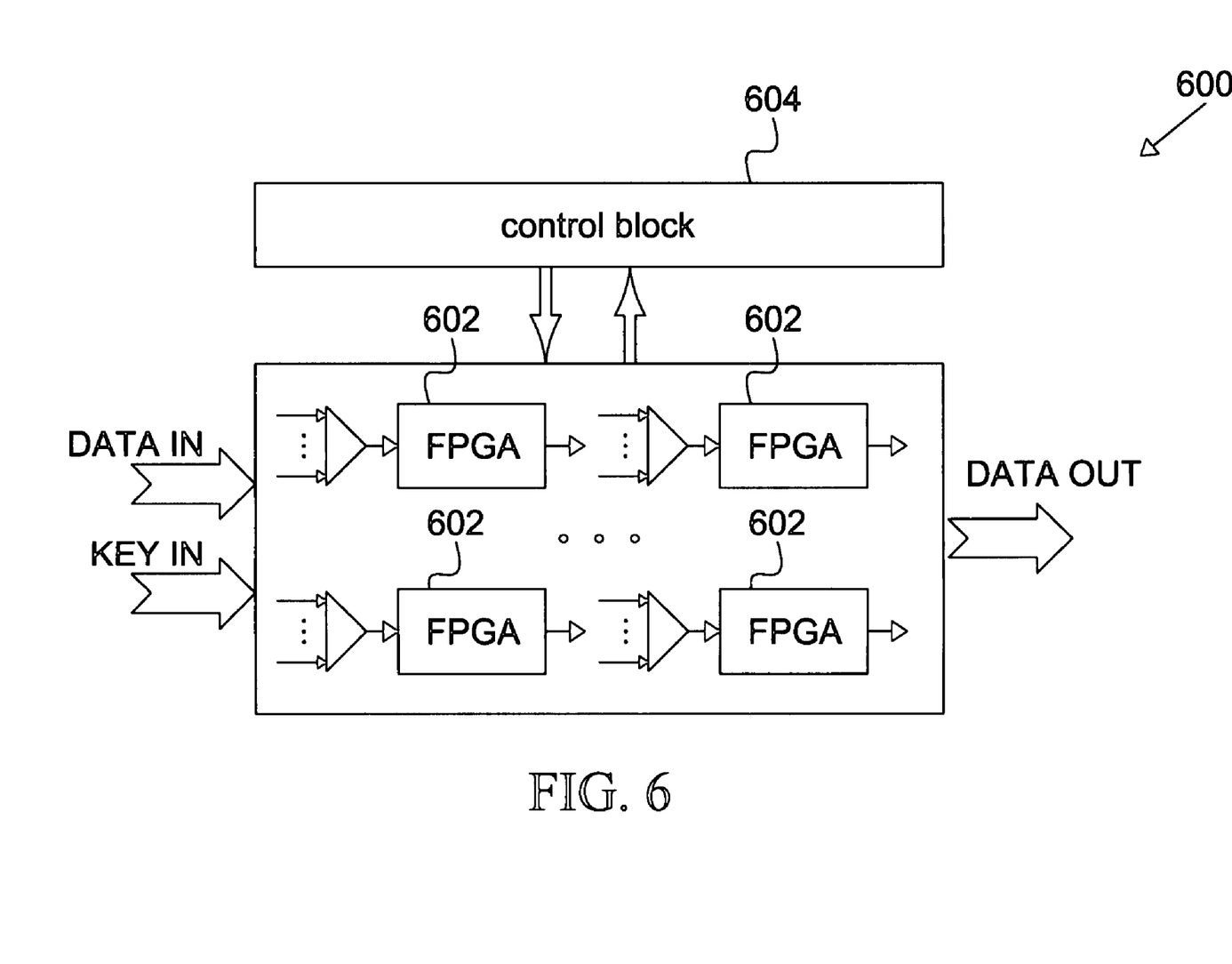
FIG. 6 is a schematic diagram illustrating a high speed data encryption architecture in accordance with an additional exemplary embodiment of the present invention.

FIG. 6 is a schematic diagram illustrating a high level conceptual view of high speed data encryption architecture 600 in accordance with an additional exemplary embodiment of the present invention. The architecture 600 includes multiple embedded FPGA blocks or cores 602 within a hardwired interconnect. A control block 604 is communicatively coupled to the FPGA blocks 602 to provide control signals. The control block 604 may be a system-level controller.

Figure 7:
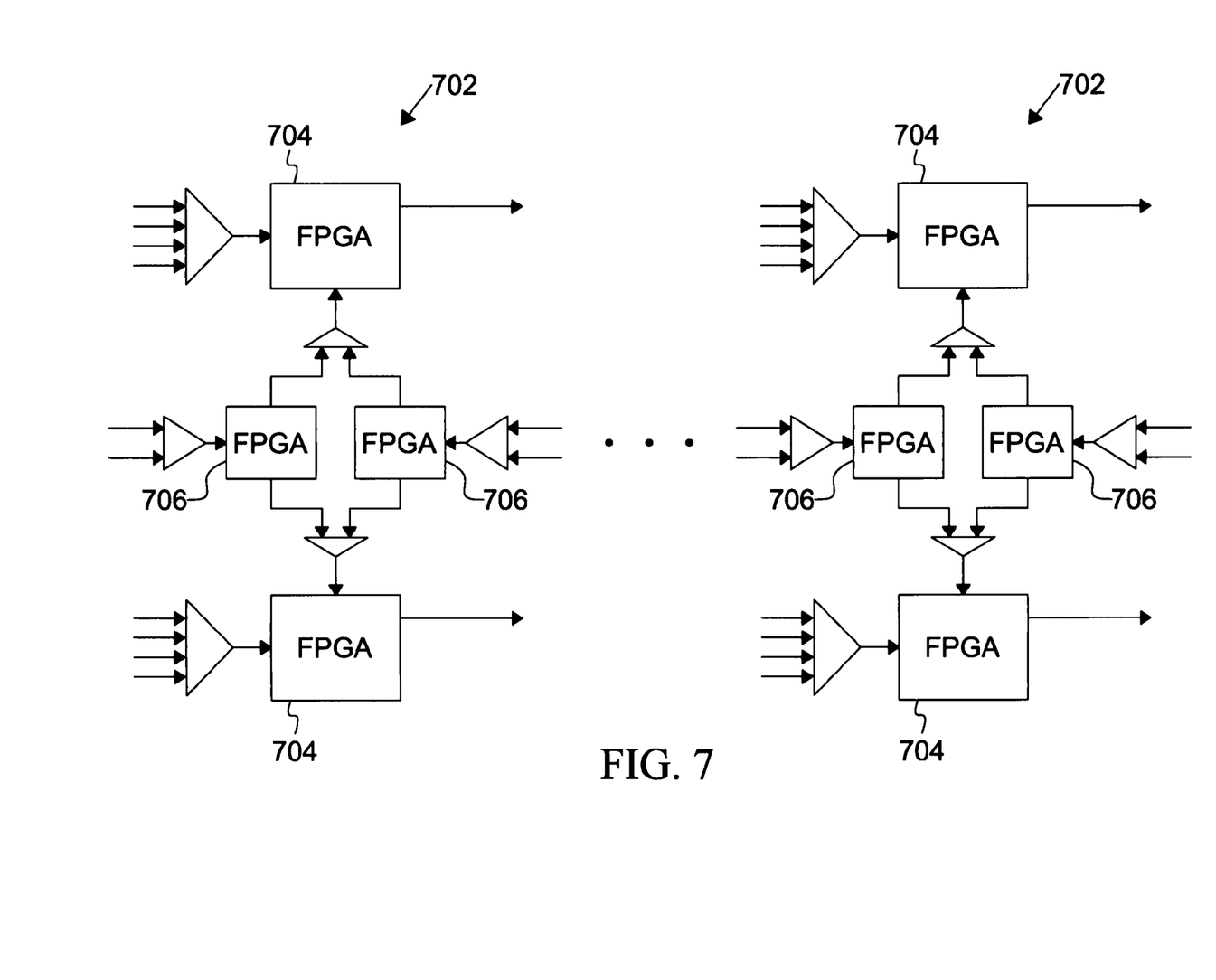
FIG. 7 is a schematic diagram illustrating a FPGA fabric structure of a high speed data encryption architecture in accordance with an additional exemplary embodiment of the present invention.

The present high speed data encryption architecture may require a tightly integrated design that allows for high speed execution in a configurable manner. In a preferred embodiment, the FPGA blocks shown in FIGS. 5 and 6 may be implemented as fabric elements 702 shown in FIG. 7. Although FIG. 7 shows two fabric elements 702, the FPGA fabric of the present high speed data encryption architecture may be fully extensible to provide additional FPGA resources as needed. This approach maximizes flexibility by targeting modern and legacy cryptographic algorithms directly to the programmable FPGA cores, while ensuring high speed execution by implementing the major datapaths using hardwired logic. The FPGA fabric architecture supports the execution of multiple concurrent algorithms, the number of which is limited only by the number of resources required for execution. The FPGA blocks and/or fabric elements are designed to be interchangeable, allowing algorithms to map to any blocks within the design. Virtualization of algorithm placement is an important feature in algorithm flexibility and agility.

Figure 8:
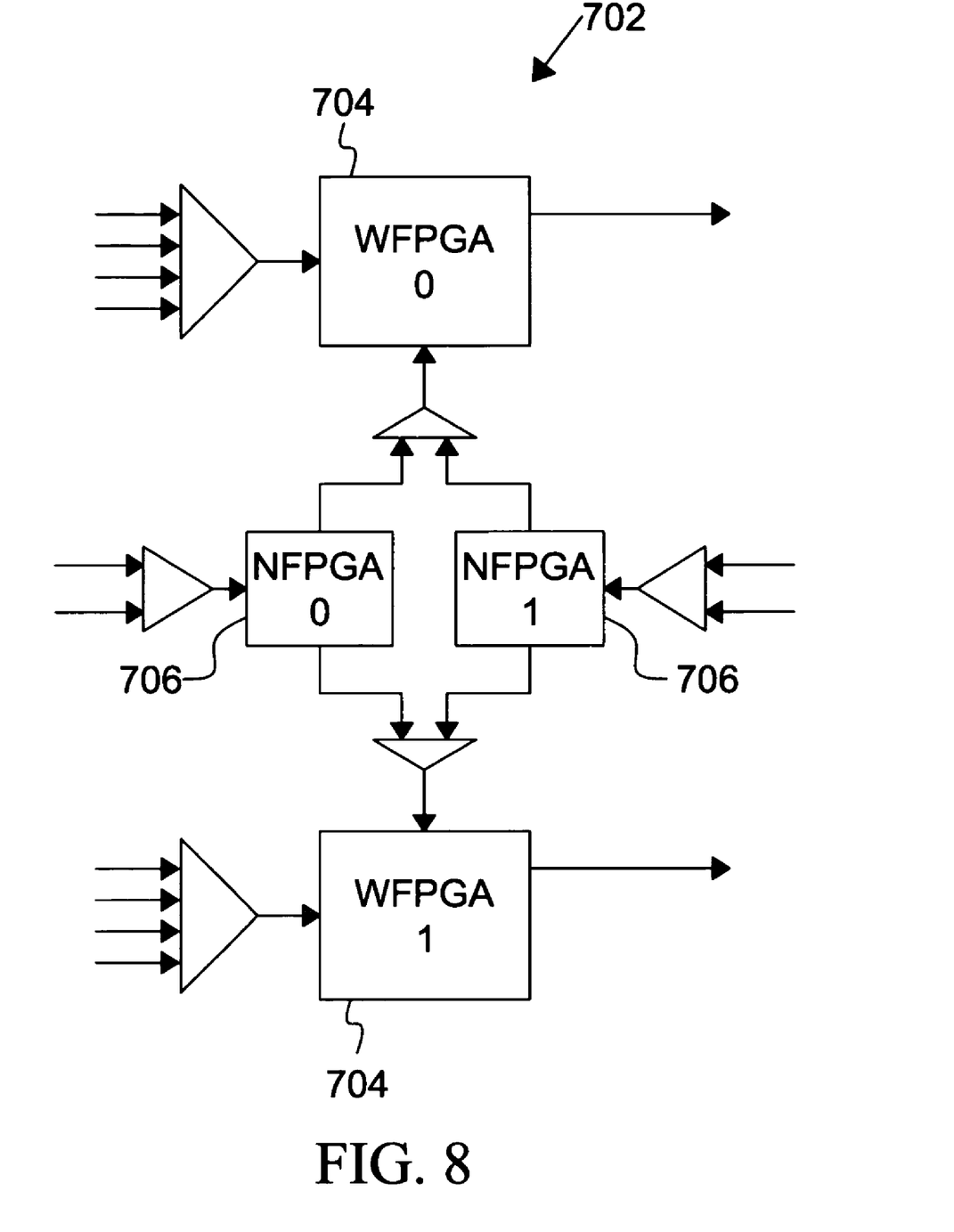
FIG. 8 is a schematic diagram illustrating a fabric element of the FPGA fabric structure shown in FIG. 7 in accordance with an exemplary embodiment of the present invention.

The FPGA fabric of the present high speed data encryption architecture may include multiple fabric elements. Two such fabric elements 702 are shown in FIG. 7. Each fabric element 702 includes two larger FPGA cores or blocks 704, two smaller FPGA cores or blocks 706, and associated hardwired interconnect. The use of two sizes of FPGA cores allows for efficient resource utilization by providing a larger core for wide datapaths and complex functions and a smaller core for narrow datapaths and less complex functions. Since the large blocks are typically allocated to wide datapaths, the larger blocks are referred to as wide blocks WFPGA0 and WFPGA1 (see FIG. 8). Similarly, the smaller blocks are often used for narrow datapaths, and are therefore named NFPGA0 and NFPGA1 (see FIG. 8). The narrow blocks 706 may also perform control functions for the wide blocks 704. Within the fabric element 702, as detailed in FIG. 8, selection logic is provided for the large FPGA block pair 704 by associating a smaller FPGA block 706 as a controller.

Figure 9:
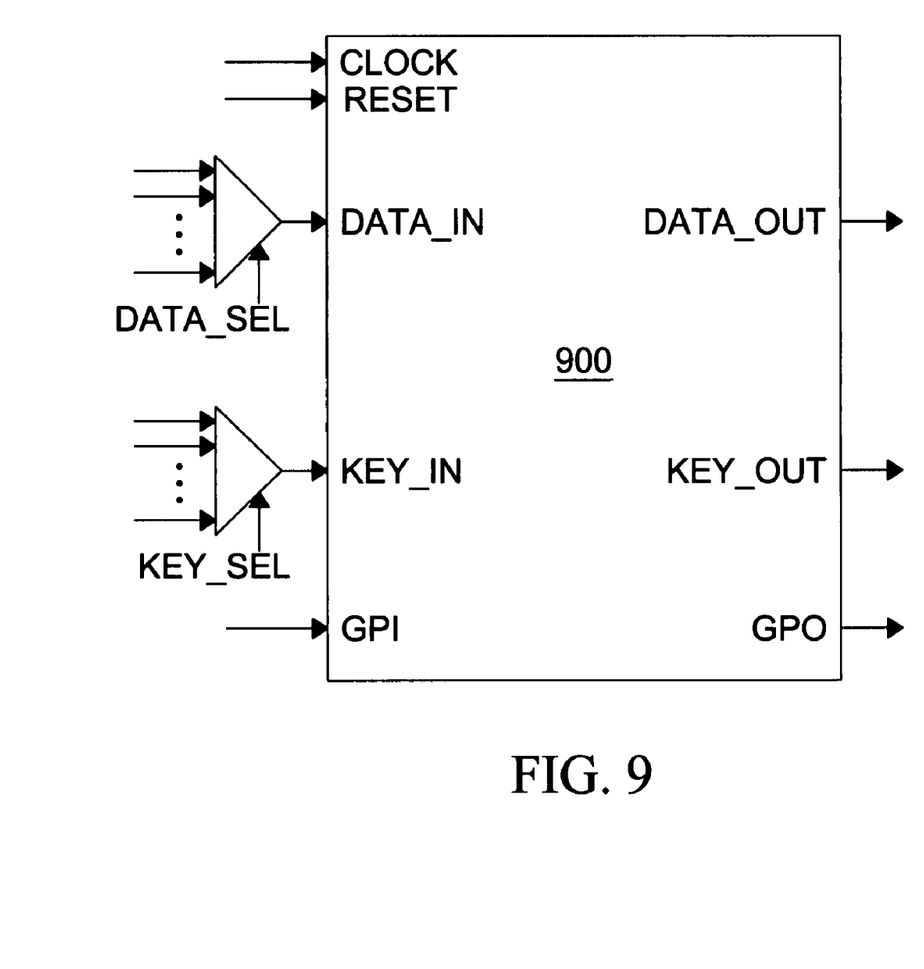
FIG. 9 is a schematic diagram illustrating a FPGA block interconnect in accordance with an exemplary embodiment of the present invention.
Figure 10A:
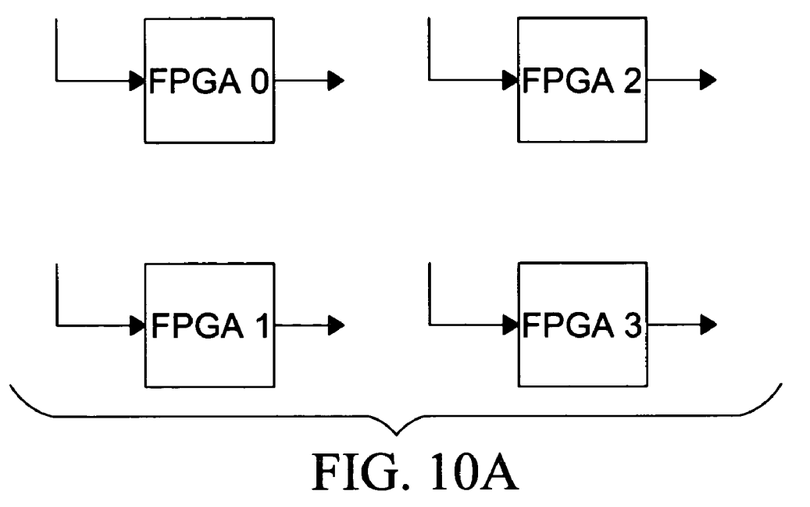
FIGS. 10A, 10B, 10C and 10D show four modes of operation in accordance with an exemplary embodiment of the present invention.
Figure 10B:
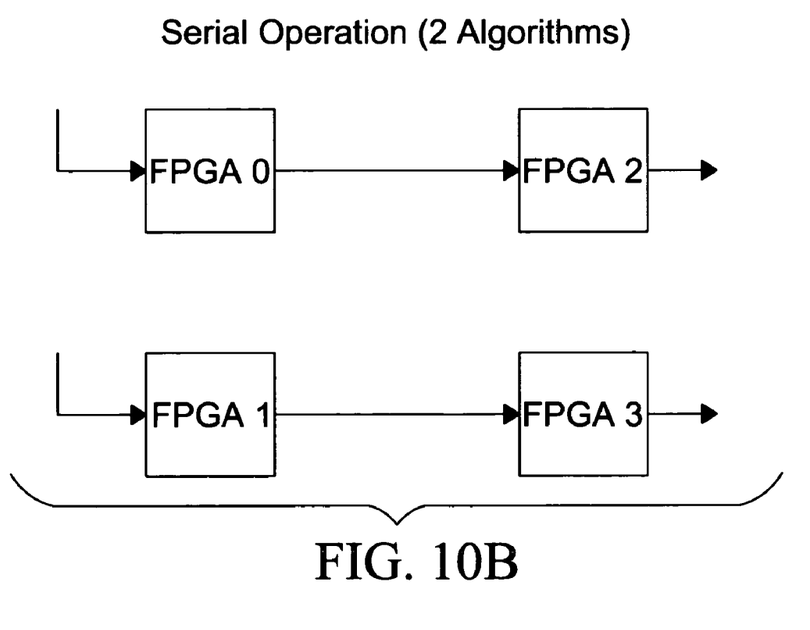
Figure 10C:
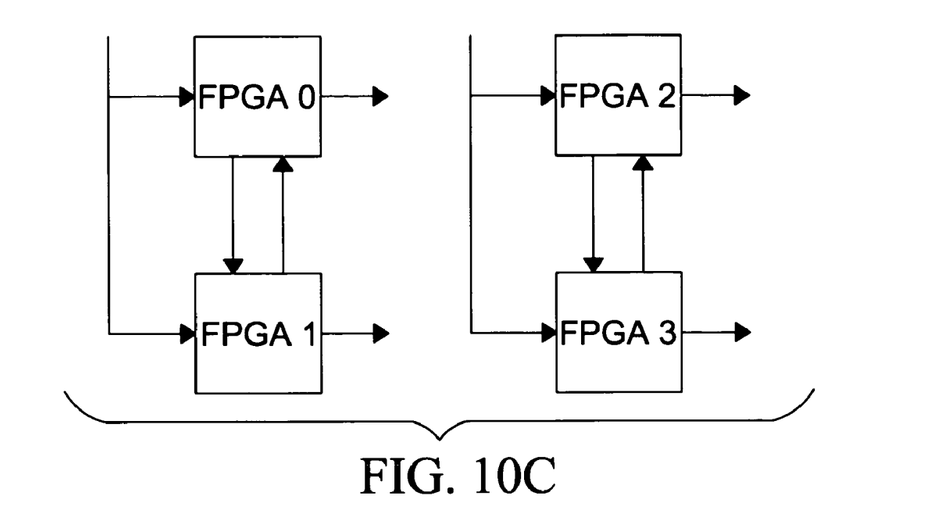
Figure 10D:
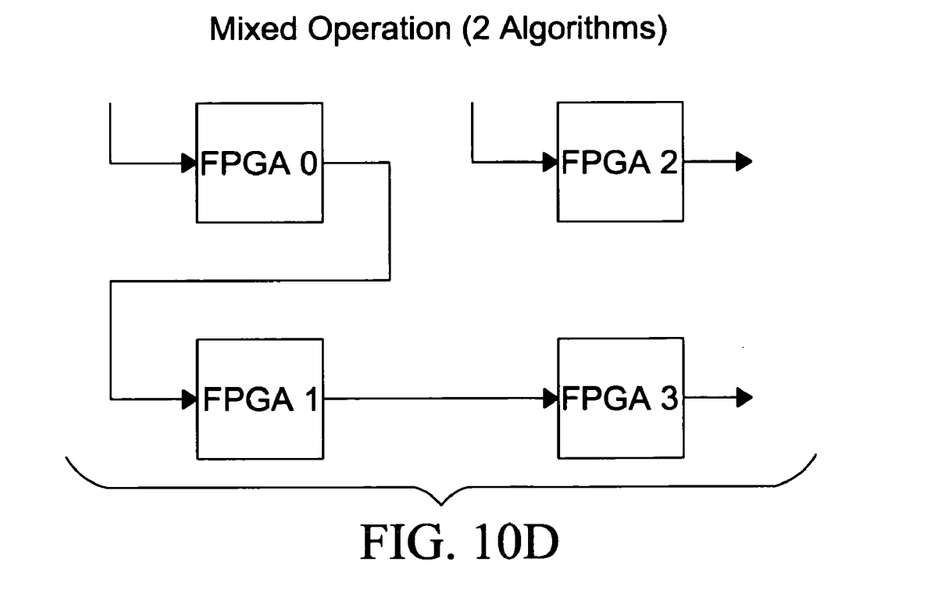

FIG. 9 shows the top level interconnect of an FPGA block 900. The FPGA block 900 may be the wide block 704 or the narrow block 706 shown in FIGS. 7 and 8. The interface of the FPGA block 900 is similar for wide and narrow blocks, differing only in the width of the input and output data buses. The FPGA block interface includes a clock, reset, data input/output, cryptographic key input/output, and general purpose I/O. Preferably, each wide FPGA block has access to the data and key output of every other wide FPGA block, as well as the top level wide datapath data input and top level wide datapath key input. Each narrow FPGA block has access to the data and key output of every other narrow FPGA block, as well as top level narrow datapath data input and top level narrow datapath key input. Data and key inputs to each block are controlled by input mux controls DATA_SEL and KEY_SEL. For wide blocks, these signals come from an associated narrow FPGA block controller. For narrow blocks, these signals are sourced by the block itself. Wide and narrow FPGA blocks may communicate through the use of the general purpose I/O ports GPI and GPO.

In one embodiment, the present high speed data encryption architecture provides a framework for independent development of modern and legacy algorithms. An algorithm is targeted directly to the FPGA fabric, describing a mode of operation (serial, parallel, combination) and resource allocation (mapping of wide and narrow FPGA blocks).

FPGA blocks of the present invention may be utilized independently, serially, or in parallel with other blocks to form complex algorithm interconnects. While smaller legacy algorithms may execute independently (one algorithm to one FPGA block), the complexity associated with modern algorithms often requires the allocation of several FPGA resources. Support for multiple concurrent algorithms is possible by allocating FPGA resources to each algorithm. Several possible modes of operation are presented in FIGS. 10A, 10B, 10C and 10D.

Targeting algorithms directly to the FPGA fabric of the present invention may require careful allocation of wide and narrow FPGA blocks. An algorithm may assign any combination of wide and narrow FGPA blocks to its allocation. However, no two concurrent algorithms may occupy the same resources. Such behavior allows the system to support algorithm agility while ensuring no data mixing between multiple independent levels of security (MILS).

In addition to selecting a resource allocation, each algorithm may be assigned a datapath type. The type may be either "wide" or "narrow", determined by the datapaths being used. Wide algorithms process input data and keys through the wide top level data and key inputs and process output data through the wide top level data output. Narrow algorithms process input data and keys through the narrow top level data and key inputs and process output data through the narrow top level data output. Preferably, a well configured wide channel may contain at a minimum one wide FPGA block, and a well configured narrow channel may contain at a minimum one narrow FPGA block. When allocating FPGA blocks for an algorithm, the designer need ensure that the logic dedicated to each block does not exceed the maximum gate count requirements of that block.

By supporting the operation of multiple concurrent algorithms within the present high speed data encryption architecture, independent development of multiple algorithms may lead to resource allocation conflicts. Consider the following system with two concurrent algorithms:

Algorithm: Foo Type: wide
        Wide block utilization: 0,1,4
        Narrow block utilization: 1,4
    Algorithm: Bar Type: wide
        Wide block utilization: 0,1
        Narrow block utilization: 1

Algorithms "Foo" and "Bar" overlap wide FPGA blocks 0 and 1, and narrow FPGA block 1. Considering an FPGA fabric containing three fabric elements, i.e. three pairs of wide blocks (WFPGA0, WFPGA1), (WFPGA2,WFPGA3), (WFPGA4, WFPGA5) and three pairs of narrow blocks (NFPGA0, NFPGA1), (NFPGA2, NFPGA3), (NFPGA4, NFPGA5), it is possible to judiciously allocate resources to accommodate both algorithms concurrently. For instance the previously described system may be allocated as follows:

Algorithm: Foo Type: wide
        Wide block utilization: 0,1,4
        Narrow block utilization: 1,4
    Algorithm: Bar Type: wide
        Wide block utilization: 2,3
        Narrow block utilization: 2

Thus, Algorithms "Foo" and "Bar" no longer share any FPGA block resources. Algorithm "Bar" still includes two wide FPGA blocks and one narrow FPGA block, simply relocated to a different location in the fabric. The present high speed data encryption architecture includes virtualization technology which supports the relocation of entire algorithms to any location in the FPGA fabric while seamlessly retaining the functionality of the independently developed algorithms.

In one aspect of the present invention, algorithms developed independently may be developed in a virtual FPGA fabric space. The allocation of FPGA blocks are a virtual allocation, describing only the relationship of wide and narrow FPGA blocks, but not the physical placement of such resources. Upon placement into a physical system, the present high speed data encryption architecture may translate these virtual allocations to physical allocations based on the availability of system resources. This is performed by populating the fields 1102 in a virtual input mux register 1100 shown in FIG. 11. Each field 1102 represents a virtual to physical translation of the inputs to each embedded FPGA block.

FIG. 9 depicts the wide and narrow FPGA block interconnects. While each differs slightly it is important to note that the input data and input key muxes which supply the inputs to each type are fully defined. Every wide FPGA block has visibility to every other wide FPGA block, and every narrow FPGA block has visibility to every other narrow FPGA block. This is an important element in allowing the relocation of algorithmic resources. As such, virtual wide blocks 0,1 may simply be moved to physical blocks 2,3 by appropriately translating the input data mux select and input key mux select control signals from the virtual space to the desired physical space.

Figure 11:
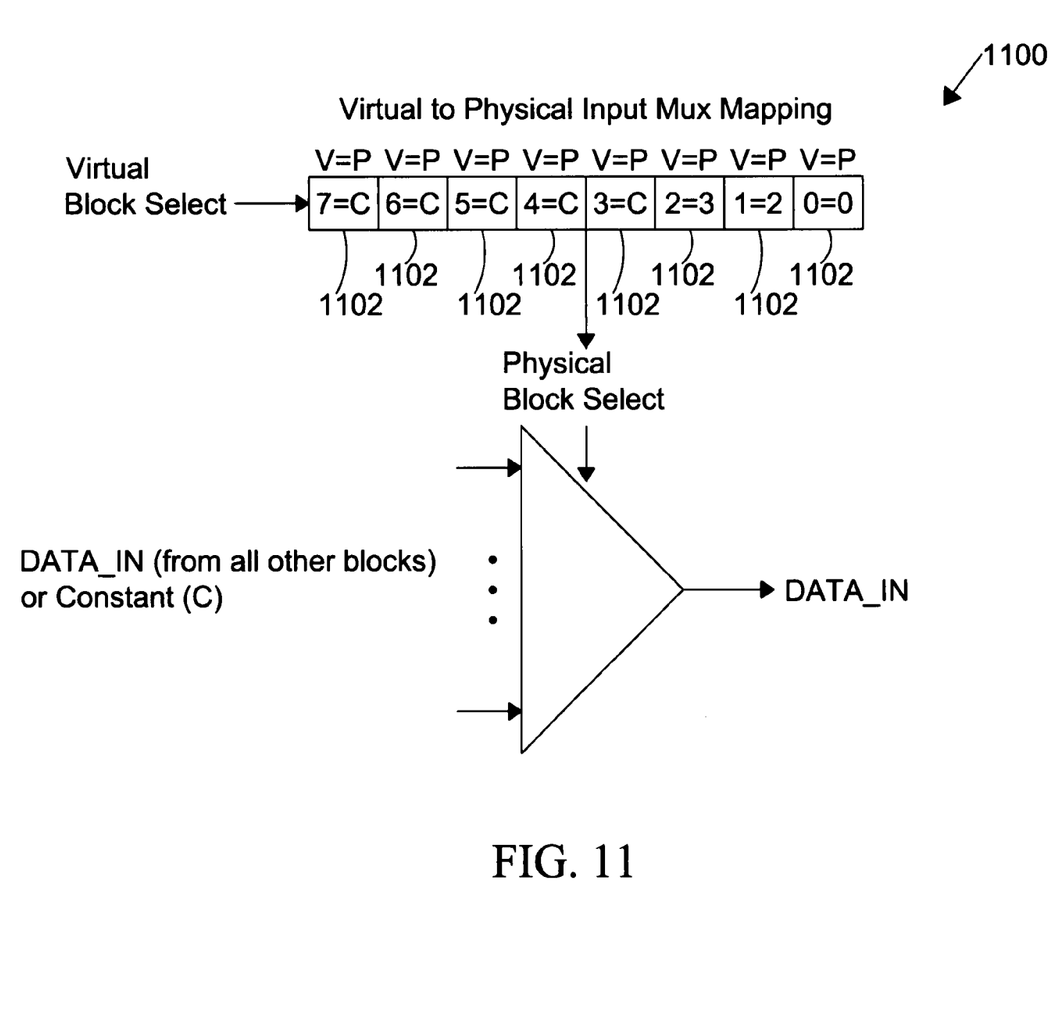
FIG. 11 is a schematic diagram illustrating a virtual input mux register in accordance with an exemplary embodiment of the present invention.

The virtual input mux register 1100 shown in FIG. 11 describes a sample virtual to physical conversion for the input data mux of an embedded FPGA block. The Virtual Block Select input is passed through the virtual input mux register 1100, and is redefined in terms of the physical space as a Physical Block Select. In the exemplary case shown in FIG. 11, virtual block 0 remains unchanged and remains mapped to physical block 0, virtual blocks 1, 2 are physically mapped to blocks 2, 3, respectively, and all other virtual blocks are set as a constant (C) to prevent them from transferring information from other FPGA blocks, thus ensuring data security and integrity.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A high speed data encryption architecture, comprising:
fabric elements communicatively coupled to one another via a hardwired interconnect configured for implementing a plurality of cryptographic algorithms, each of said fabric elements including:
a plurality of wide field programmable gate array (FPGA) blocks used for wide datapaths; and
a plurality of narrow FPGA blocks used for narrow datapaths,
wherein each of said plurality of wide FPGA blocks being communicatively coupled to each other and are interchangeable so that one of said plurality of cryptographic algorithms is mapped to one of said plurality of wide FPGA blocks, each of said plurality of narrow FPGA blocks being communicatively coupled to each other and are interchangeable so that one of said plurality of cryptographic algorithms is mapped to one of said plurality of narrow FPGA blocks; and
a control block, communicatively coupled to each of said fabric elements via said hardwired interconnect, for providing control signals to said each of said fabric elements,
wherein said fabric elements are configured for implementing at least two of said plurality of cryptographic algorithms concurrently, and no two concurrent cryptographic algorithms are allocated on a same wide FPGA block or a same narrow FPGA block.

2. The high speed data encryption architecture of claim 1, wherein said high speed data encryption architecture uses loop unrolling to improve timing during execution of said cryptographic algorithms.

3. The high speed data encryption architecture of claim 1, wherein said plurality of wide FPGA blocks is a pair of wide FPGA blocks, and said plurality of narrow FPGA blocks is a pair of narrow FPGA blocks.

4. The high speed data encryption architecture of claim 3, wherein said pair of narrow FPGA blocks performs control functions for said pair of wide FPGA blocks.

5. The high speed data encryption architecture of claim 1, wherein said each of said plurality of wide FPGA blocks includes a interface having a clock, reset, data input/output, cryptographic key input/output and general purpose input/output.

6. The high speed data encryption architecture of claim 5, wherein said each of said plurality of wide FPGA blocks has access to data and key output of every other wide FPGA block and has access to a top level wide datapath data input and a top level wide datapath key input.

7. The high speed data encryption architecture of claim 1, wherein said each of said plurality of narrow FPGA blocks includes a interface having a clock, reset, data input/output, cryptographic key input/output and general purpose input/output.

8. The high speed data encryption architecture of claim 7, wherein said each of said plurality of narrow FPGA blocks has access to data and key output of every other narrow FPGA block and has access to a top level narrow datapath data input and a top level narrow datapath key input.

9. The high speed data encryption architecture of claim 1, wherein said plurality of wide FPGA blocks and said plurality of narrow FPGA blocks are utilized individually, serially, or in parallel to implement said cryptographic algorithms.

10. The high speed data encryption architecture of claim 1, wherein said high speed data encryption architecture utilizes algorithm virtualization to support a relocation of a cryptographic algorithm.

11. The high speed data encryption architecture of claim 1, further comprises a virtual input mux register to translate a virtual allocation of wide and narrow FPGA blocks to a physical allocation of wide and narrow FPGA blocks.

12. A method for implementing a plurality of cryptographic algorithms using field programmable gate arrays (FPGAs), comprising:
providing fabric elements that are communicatively coupled to one another via a hardwired interconnect, each of said fabric elements including:
a plurality of wide FPGA blocks used for wide datapaths; and a plurality of narrow FPGA blocks used for narrow datapaths,
wherein each of said plurality of wide FPGA blocks being communicatively coupled to each other and are interchangeable so that one of said plurality of cryptographic algorithms is mapped to one of said plurality of wide FPGA blocks, each of said plurality of narrow FPGA blocks being communicatively coupled to each other and are interchangeable so that one of said plurality of cryptographic algorithms is mapped to one of said plurality of narrow FPGA blocks;
providing control signals to said each of said fabric elements using a control block; and
configuring said fabric elements to implement at least two of said cryptographic algorithms concurrently, and no two concurrent cryptographic algorithms are allocated on a same wide FPGA block or a same narrow FPGA block.

13. The method of claim 12, wherein loop unrolling is used to improve timing during execution of said cryptographic algorithm.

14. The method of claim 12, wherein said plurality of wide FPGA blocks and said plurality of narrow FPGA blocks are utilized individually, serially, or in parallel to implement said cryptographic algorithm.

15. The method of claim 12, wherein algorithm virtualization is utilized to implement said cryptographic algorithm.

16. A system for implementing a plurality of cryptographic algorithms using field programmable gate arrays (FPGAs), comprising:
fabric elements that are communicatively coupled to one another via a hardwired interconnect, each of said fabric elements including:
a plurality of wide FPGA blocks used for wide datapaths; and
a plurality of narrow FPGA blocks used for narrow datapaths,
wherein each of said plurality of wide FPGA blocks being communicatively coupled to each other and are interchangeable so that one of said plurality of cryptographic algorithms is mapped to one of said plurality of wide FPGA blocks, each of said plurality of narrow FPGA blocks being communicatively coupled to each other and are interchangeable so that one of said plurality of cryptographic algorithms is mapped to one of said plurality of narrow FPGA blocks;
means for providing control signals to said each of said fabric elements; and
means for configuring said fabric elements to implement at least two of said cryptographic algorithms concurrently, and no two concurrent cryptographic algorithms are allocated on a same wide FPGA block or a same narrow FPGA block.

* * * * *